J. WATT.
Combined Heating Furnace and Boiler.
No. 38,521. Patented May 12, 1863.
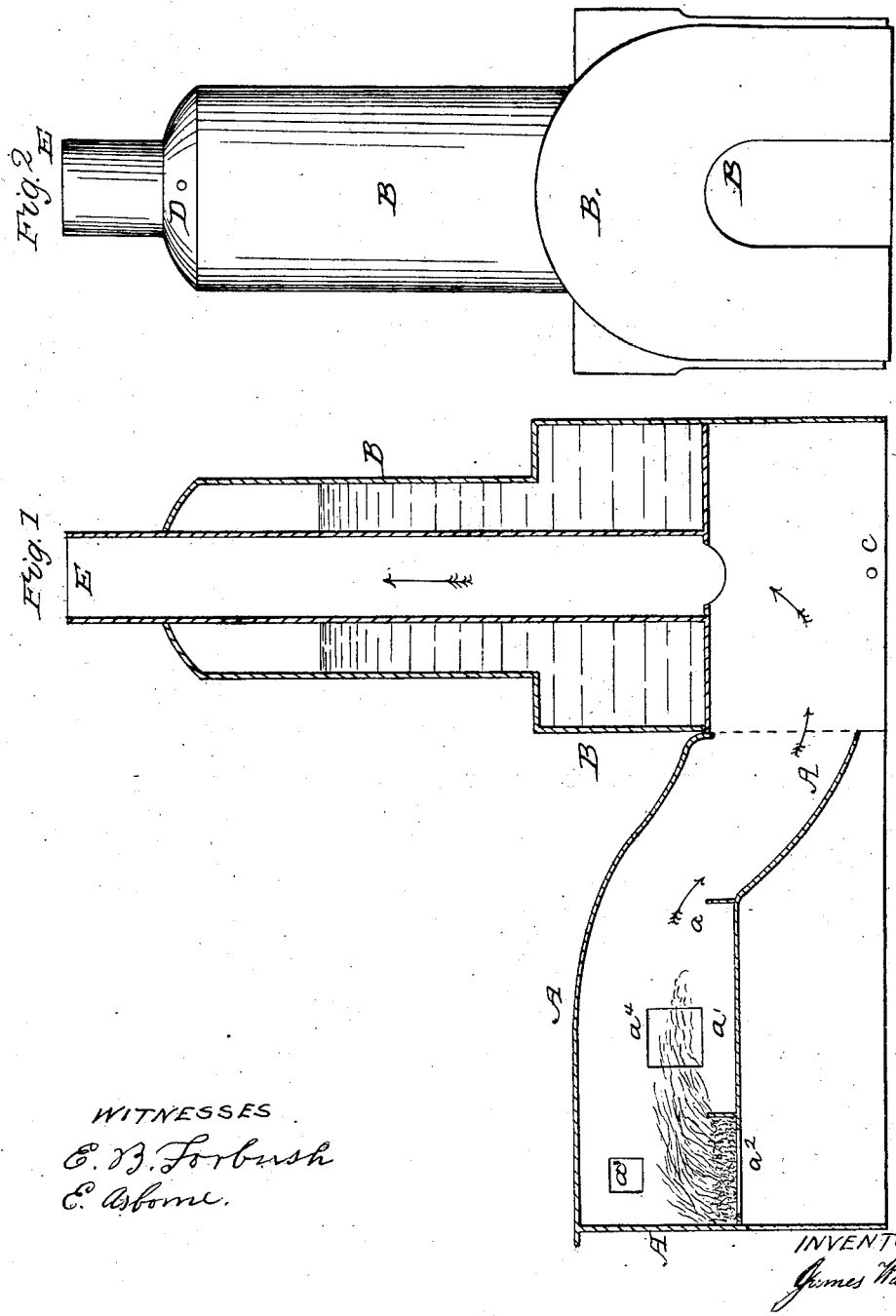

UNITED STATES PATENT OFFICE.

JAMES WATT, OF BUFFALO, NEW YORK.

IMPROVEMENT IN UTILIZING THE WASTE HEAT OF PUDDLING-FURNACES, &c., IN GENERATING STEAM.

Specification forming part of Letters Patent No. 38,521, dated May 12, 1863.

*To all whom it may concern:*

Be it known that I, JAMES WATT, assignor to myself and HENRY CHILDS, of Buffalo, in the State of New York, have invented a new and useful Improvement in Combined Heating or Puddling Furnace and Boiler; and I do hereby declare that the following is a full, clear, and exact description of the same, reference being had to the accompanying drawings, making a part of this specification, in which—

Figure I is a vertical longitudinal section. Fig. II is an end elevation.

Letters of like name and kind refer to like parts in each of the figures.

The nature of my invention relates to the peculiar arrangement and combination of a steam-boiler with a puddling for heating furnace, so that the whole of the waste heat from the furnace and the heat of the slag formed in the furnace may be used to heat the water in boiler, to furnish steam to drive the machinery used in connection therewith.

A represents a furnace of ordinary construction, which may be a puddling, heating, or other furnace.

$a'$ is the hearth; $a^2$, the grate upon which the fuel is laid; $a^3$, door for supplying fuel; $a^4$, door opening onto the hearth. The bridge $a^5$ has apertures through it to allow the slag to run down into the fire-chamber of the boiler.

B represents the boiler. This has a large base, which is so made as to form an arched combustion-chamber within, as shown at B', Fig. II. The boiler is located at the end of the furnace, standing upon a horizontal plane with the furnace. The object of locating the boiler at the end of the furnace, and upon a horizontal plane therewith, is so that the surplus heat and slag from the furnace may be easily directed into a fire-chamber within the boiler, thereby saving all the surplus heat from the furnace and also the heat of the slag for making steam. This location is also more convenient and economical than if a boiler is located above the furnace, as heretofore. It is more convenient in saving room, and is also more economical in the saving and use of the surplus heat for making steam, beside the additional advantage in gaining heat from the slag. The fire-chamber B' has a door, or is walled up with fire-brick at its outer end, which gives easy access to the interior of the fire-chamber and boiler, for cleaning or repairing.

$c$ is opening or cock for the admission of water into the boiler; D, opening for steam-pipe on valve; E, chimney.

The arrows show the course which the flame and smoke take in passing from the furnace through the boiler.

What I claim as my invention, and desire to secure by Letters Patent, is—

The location of the boiler at the end of the furnace, and on a horizontal plane therewith, so that the surplus heat and slag from the furnace may be directed into a fire-chamber, B', within the boiler, for the purpose and substantially as described.

JAMES WATT.

Witnesses:
E. B. FORBUSH,
E. OSBORNE.